United States Patent
Bunton et al.

(10) Patent No.: US 7,043,195 B2
(45) Date of Patent: May 9, 2006

(54) COMMUNICATIONS SYSTEM

(75) Inventors: John David Bunton, St Clair (AU); Graham Ross Daniels, Willoughby (AU); Colin Eric Jacka, North Turramurra (AU)

(73) Assignee: Commonwealth Scientific and Industrial Research Organization, Australian Capital Territory (AU)

( * ) Notice: Subject to any disclaimer, the term of this patent is extended or adjusted under 35 U.S.C. 154(b) by 0 days.

(21) Appl. No.: 10/148,455

(22) PCT Filed: Nov. 29, 2000

(86) PCT No.: PCT/AU00/01469

§ 371 (c)(1),
(2), (4) Date: Dec. 18, 2003

(87) PCT Pub. No.: WO01/41326

PCT Pub. Date: Jun. 7, 2001

(65) Prior Publication Data

US 2004/0102219 A1  May 27, 2004

(30) Foreign Application Priority Data

Nov. 29, 1999 (AU) .................................. PQ4333
Oct. 27, 2000 (AU) .................................. PR1063

(51) Int. Cl.
*H04B 7/15* (2006.01)

(52) U.S. Cl. ................... 455/11.1; 455/9; 455/39; 455/40

(58) Field of Classification Search ............... 455/7, 455/9, 39, 40, 11.1, 13.1, 15, 16, 19, 24
See application file for complete search history.

(56) References Cited

U.S. PATENT DOCUMENTS

| | | | | | |
|---|---|---|---|---|---|
| 4,207,568 | A | * | 6/1980 | MacLeod | 340/852 |
| 4,471,356 | A | | 9/1984 | Gidl | 340/989 |
| 4,777,652 | A | * | 10/1988 | Stolarczyk | 455/3.03 |
| 4,868,887 | A | | 9/1989 | Bertrand | 455/41 |
| 5,774,791 | A | * | 6/1998 | Strohallen et al. | 455/41.1 |
| 5,812,598 | A | * | 9/1998 | Sharma et al. | 375/259 |
| 6,571,284 | B1 | * | 5/2003 | Suonvieri | 709/221 |
| 6,690,662 | B1 | * | 2/2004 | Komara et al. | 370/342 |

FOREIGN PATENT DOCUMENTS

| | | |
|---|---|---|
| CH | 688 532 A5 | 10/1997 |
| EP | 0 292 950 A2 | 11/1988 |
| GB | 2 126 845 | 3/1984 |
| GB | 2 197 160 | 5/1988 |

* cited by examiner

*Primary Examiner*—CongVan Tran
(74) *Attorney, Agent, or Firm*—Lades & Parry LLP

(57) ABSTRACT

A communications system, including at least one base station (8) at the surface, at least one repeater station (6) below the surface, and at least one mobile station (4) below the surface, the stations (4, 6, 8) establishing a bidirectional communications path between the mobile station (4) and the base station (8).

40 Claims, 11 Drawing Sheets

COMMUNICATIONS SYSTEM

The present invention relates to a communications system and, in particular, to a bidirectional communications system which can operate between parties below, or a party on and a party below, the surface of the earth or of a body of water without reliance on any connective infrastructure.

Communications through the earth, particularly in mines, has proved problematic for a number of years and has generally required a communications system which employs a connective infrastructure, such as the use of leaky feeders, to aid communications signal propagation. Similar problems exist with electromagnetic communication between parties in an underwater environment or in any situation where the communicating parties are separated by a relatively lossy medium for electromagnetic waves, such as the earth or water. The working range of communications systems currently employed is limited, particularly in an emergency situation following an incident that removes any of the connective infrastructure or air path between parties.

For instance, in an emergency situation in an underground mine, the determination of the location and establishment of the condition of affected persons, and the communication of proposed rescue strategies, is important. Communications systems are usually in place in underground mines and collieries to facilitate management and control of operations together with safety support through rapid response to calls for assistance. However, after an incident or disaster the infrastructure of existing systems cannot be relied upon to remain intact. Electromagnetic wave propagation could be used for communication, but electromagnetic propagation through the earth is extremely range-limited due to the conductive characteristics of the medium. Radio communications directly through the earth that are relatively unaffected by strata conductivity can only be performed using extra low frequencies (ELF) or very low frequencies (VLF), i.e. below about 30 kHz. Yet large antennas and large transmit antenna energy requirements are necessary for useful range, and only limited bandwidths are possible. A communications system has previously been developed using these frequencies to convey messages from the surface of a mine to personnel underground. However, the establishment of reliable communications in the reverse direction is a much more difficult problem, due to: (i) the need to remain within safe antenna energy limits underground; (ii) the limited power sources available to be used in a portable transmitter worn by personnel underground; (iii) the considerably larger amount of corruptive noise at the surface, where a sensitive receiver is required to detect the extremely low signal reaching the surface through the lossy medium, and (iv) the small size of the antenna that is practical in mobile applications.

In accordance with the present invention there is provided a communications system, including:
  at least one base station at the surface;
  at least one repeater station below the surface; and
  at least one mobile station below the surface;
  said stations establishing a bidirectional communications path between the mobile station and the base station.

Preferably the bidirectional communications path includes a first uplink from the mobile station to the repeater station and a second uplink from the repeater station to the base station. Preferably the communications path also includes a downlink from the base station to the mobile station and/or downlinks from the base station to the repeater station and from the repeater station to the mobile station, respectively.

Advantageously at least a part of the communications path to and from the mobile station may be wireless. Preferably the downlink to and the uplink from the mobile station is wireless. Advantageously all of the communication links may be wireless. Preferably first carrier frequencies between the mobile station and the repeater station and second carrier frequencies between the repeater station and the base station are substantially different. For example, for communications through earth, the carrier frequency between the mobile station and the repeater station may be approximately 10 kHz and the carrier frequency between the repeater station and the base station may be approximately 500 Hz.

The communications system preferably includes a plurality of the repeater station arranged in a cellular structure to cover respective communication cells. Preferably the mobile station includes an antenna with a relatively reduced aperture compared to the apertures of the repeater station and the base station antennas.

The stations of the communications system preferably include link management means for monitoring characteristics of links between the stations, respectively, and for adapting communication parameters of links between the stations on the basis of said characteristics. The characteristics may include link integrity and quality based on signal strength and signal-to-noise ratio (SNR) data. The parameters may include frequency, timeslot, modulation type and/or data rate allocation.

Advantageously, the system may further include a conductor magnetically coupled to said mobile station to increase the communications path range of said mobile station.

Advantageously, said conductor may form a closed loop, and said loop may advantageously be made resonant at the frequency of operation to further increase the communications path range of said mobile station.

The present invention also provides a communications system, including:
  at least one base station;
  at least one repeater station; and
  at least one mobile station;
  said stations establishing a bidirectional communications path between the mobile station and the base station, and the communications path from the mobile station to the repeater station is a magnetically coupled wireless communications path.

The present invention also provides a communications system, including:
  a receiver station;
  a mobile station; and
  conducting means magnetically coupled to said mobile station and said receiver station, said stations establishing a communications path therebetween using said conducting means.

Preferred embodiments of the present invention are hereinafter described, by way of example only, with reference to the accompanying drawings, wherein.

Figure 1:
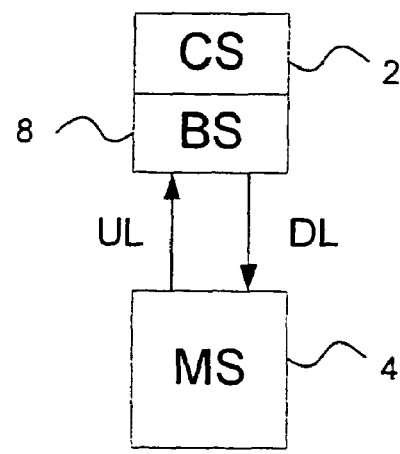
FIG. 1 is a block diagram of a communications system.
Figure 2:
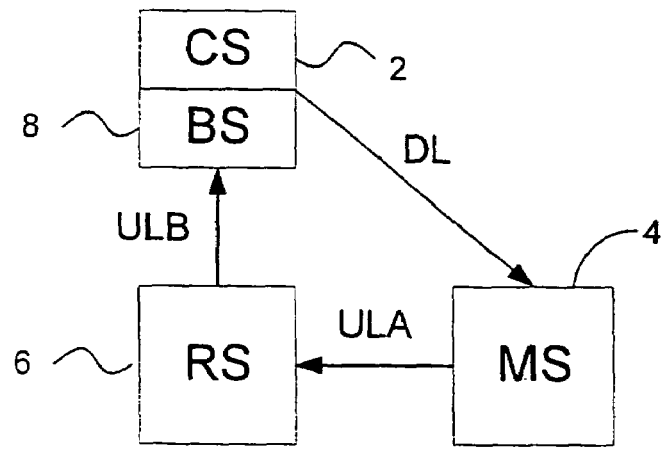
FIG. 2 is a block diagram of a preferred embodiment of a communications system.
Figure 3:
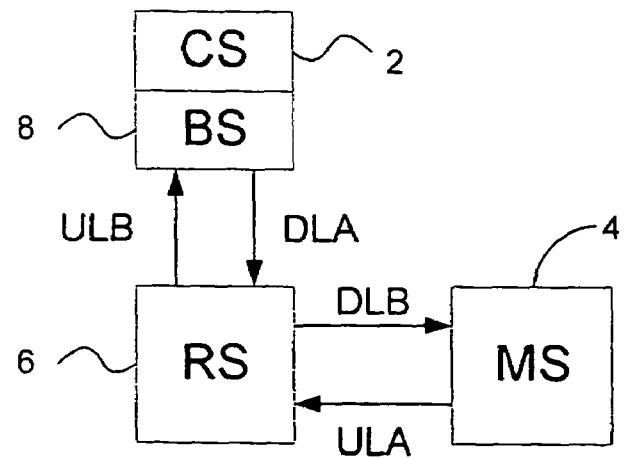
FIG. 3 is a block diagram of a second preferred embodiment of a communications system.

A communications system for duplex communication with a person or party under a surface, as shown in FIG. 1, includes a combined control station (CS) 2 and base station (BS) 8, provided by a single unit, communicating with a mobile station (MS) 4 carried by a person under the surface. The person or party may be underground, such as in a mine, or underwater. The system establishes an uplink communications path (UL) and a downlink communications path (DL) between the CS/BS and the MS. A repeater station (RS) 6 is used to establish the uplink path, which consists of two paths, ULA from the MS to the RS and ULB from the RS to CS/BS, as shown in FIG. 2. If desired, the communications system can also be configured so that the RS 6 is used in establishing the downlink path, which would then also have two components, DLA from the CS/BS to the RS and DLB from the RS to the MS, as shown in FIG. 3. The communications system may include a single RS or a number of RSs to cover a wider communications area and/or to provide redundant communication paths. The RSs 6 are relatively fixed in location, whereas the MSs 4 are normally mobile and can be carried by a person. The system also ordinarily includes multiple MSs for respective individual users to provide a multi-user communications system. Depending on the communications coverage required, a plurality of base stations (BS) 8 may also be employed.

Figure 4:
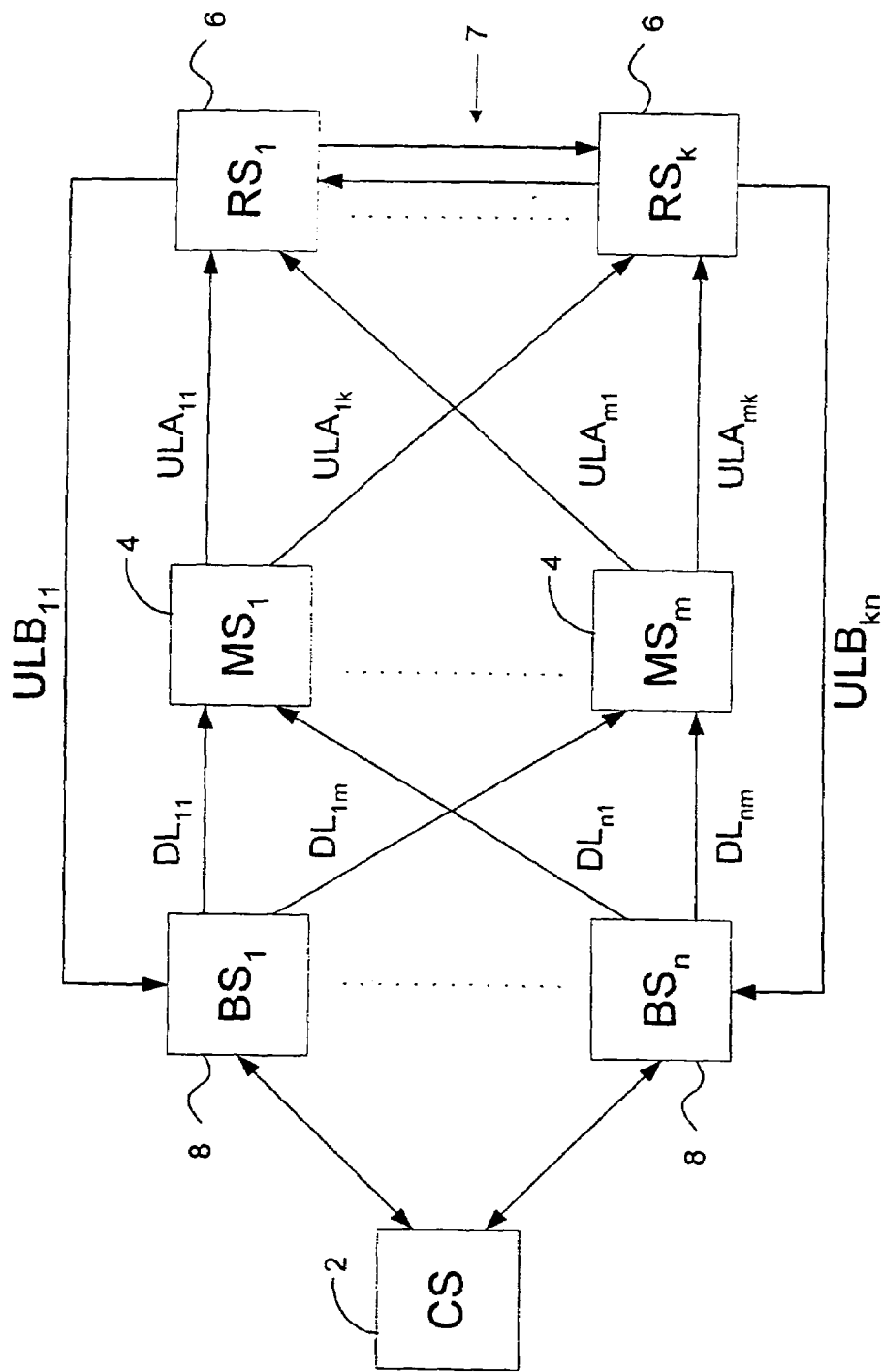
FIG. 4 is a block diagram of a third preferred embodiment of a communications system.

FIG. 4 shows a general architecture for the communications system where a plurality of base stations ($BS_1$ to $BS_n$) 8 are employed which communicate with a central control station (CS) 2. A plurality of repeater stations ($RS_1$ to $RS_k$) and mobile stations ($MS_1$ to $MS_m$) are also employed. The repeater stations ($RS_1$ to $RS_k$) are able to communicate with one another via dedicated multiple communication paths 7 and the architecture of FIG. 4 establishes multiple downlink paths $DL_{11}$–$DL_{mm}$ between the base stations and the mobile stations. Multiple uplink paths are also established between the mobile stations and the repeater stations $ULA_{11}$–$ULA_{mk}$ and between the repeater stations and the base stations $ULB_{11}$–$ULB_{kn}$. The uplink and downlink paths and the communication paths between the repeater stations are capable of being wireless electromagnetic propagation paths which do not require any physical infrastructure, such as communication wires or leaky feeders. In practice, only a subset of these links would have an acceptably low path loss to form a practical communications system, for example due to interference. Various subsets of the multiple propagation paths shown in FIG. 4 will provide a reliable communications infrastructure provided functional complimentary uplink and downlink paths are established. The repeater stations 6 and base stations 8 are sited in such a manner as to provide the required communication coverage and redundancy. For the purposes of clarity, the following description of the preferred embodiments is provided in relation to a communications system having a repeater station 6 and a mobile station 4 under the earth, and in particular in a mine. Electromagnetic propagation between the BS, MS and RS is therefore directly through the earth. The RSs 6 act as relatively fixed repeaters and the MS 4 is normally used as a personal miner terminal. The control station CS 2 and base stations BS 8 may be placed on or above the surface or below the surface. Clearly additional indirect downlink paths, as shown in FIG. 3 could also exist, but for the purposes of clarity, these additional paths have been omitted from FIG. 4.

The stations 4, 6 and 8 use antennas to minimise the link path loss, relying on the magnetic field linkage between antenna elements. The magnetic field can be generated by causing a current to flow in a loop of wire of the antenna. This results in a transmitter whose strength may be defined by its magnetic moment, which is the product of the current and the effective area of the loop.

Even though the wavelength of the electromagnetic waves in the conductive medium is much less than when propagating in free space, for the carrier frequencies used, the link ranges are within a small number of wavelengths. This means that the communications system is not operating in the 'far field'. In other words the dominant energy transfer mechanism never gets to be a true electromagnetic wave consisting of just quadrature electric and magnetic fields of equal peak energy density. For the magnetic field generated by a loop this means there are no nulls in the beam pattern of the antenna. At any frequency the link range is constrained by the skin depth, of the medium at that frequency. For a magnetic dipole antenna, in a lossless medium, the near field magnetic field varies as $1/r^3$, where r is the distance from the magnetic dipole. In a conductive medium, at a distance approximately equal to the skin depth, the additional exponential attenuation of the magnetic field strength with distance becomes significant. Link range is normally considered to be limited to a distance where the exponential decrease is starting to predominate. The text book "Introduction to Electromagnetic Fields and Waves" by Corson & Lorrain, published by W. H. Freeman & Co, provides explanations on the field of a magnetic dipole and the effect of skin depth.

Within the range that the system can operate satisfactorily, a receive antenna can always be oriented to pick up a signal no matter what the orientation of the transmit loop. The easiest method of constructing a large loop underground or on the surface is just to lay the wire on the ground. With this arrangement the best coupling occurs when the bottom loop is laid out on the floor of the mine and located directly under the top loop so the antennae axes are collinear. This relative positioning is also optimal if the loops are both rotated 90 degrees so that the loops are coplanar. This vertical coplanar loops configuration is generally not practical for large loops because of the difficulty in achieving sufficient loop area and hence, magnetic moment, in the transmit antenna. However, when the transmit antenna is restricted in size (as for the portable antenna of the MS 4) coplanar orientation, in a horizontal plane, becomes the preferred one because of its omni-directionality and the fact that it maximises range for the communications system. The actual coupling in any situation may be calculated from the full field equations for propagation in a lossy medium.

At the receiver, either absolute magnetic field, detected by Superconducting Quantum Interference Devices (SQUIDs) or Hall Effect devices, or rate of change of magnetic field, detected by loop antennas, can be utilised. The rate of change of magnetic field method, using the loop antenna as the detector, currently provides the best sensitivity for mine applications. If the conductivity of the medium that the signal is propagating through, as well as the background magnetic noise spectrum, is known then it is possible to determine the transmit frequency which maximises the receive signal SNR for a given propagation distance and antenna aperture, as described below. For the propagation between fixed stations (BS and RS) and in general (depending on geometry) between the base station BS and the mobile station MS the distance the signal has to propagate over is known. This, together with the known noise level at the receiver allows the optimum operating frequency and the minimum acceptable magnetic moment of the transmitter to be calculated. The fixed RS and BS stations are designed to operate at a frequency consistent with the calculated optimum frequency. At the base station there is normally no problem in generating sufficient magnetic moment.

Underground there are limitations on available power and on energy storage in the transmit antenna, for instance due to an intrinsic safety limitation within coal mines. This, together with generally high noise levels at the surface, is a limiting factor in the uplink. However, even with this limitation, the magnetic moment can generally be increased by increasing the area of the loop for a RS, and given the distance between the stations and the conductivity of the intervening material there is an optimum transmission frequency.

The situation for a MS is quite different. The size of the transmitter is physically constrained to be small and hence the maximum possible magnetic moment that can be generated is generally orders of magnitude smaller than what is possible with a fixed installation. This in general precludes direct communications from a mobile underground transmitter to the surface. Instead, advantageously the system sends all communications via a relatively fixed RS. As the distance over which transmission can be achieved is much smaller this means that the optimum transmit frequency for the mobile station will be much higher than that of the other transmitters. For a known noise level at the receiver and transmitter magnetic moment it is possible to optimise this frequency and hence maximise the distance over which propagation is possible.

The communications system has a relatively low allowed message transfer latency and high required throughput in view of the low raw link data rate. The system architecture is driven by these requirements as well as the need for robustness of communication in severely disruptive conditions of a post-disaster situation.

A number of other factors were considered when designing the communications system and these are discussed below. In addition to unique design features, the system contains a number of features found in modern digital communication systems, and in particular, wireless systems.

The major advantages of having a bidirectional communications system between a miner and the surface, apart from the ability to pass user messages in either direction, relate to: (i) feedback error recovery; and (ii) automated verification of message delivery.

Feedback error recovery allows higher user message throughput to be achieved (at a given message error rate) than would otherwise be possible on the link, while automated delivery verification increases confidence that the message has reached the desired destination and reduces the need for manual confirmation. The latter saving reduces the workload of personnel and increases the speed with which actions may be taken. An extension of automatic message delivery verification is continuous link integrity monitoring, as described below, and, in the case of a system architecture having a cellular structure, automatic localisation of individual miners at the cell level.

The underground transmitters of the RS 6 and MS 4 are often, for fire safety reasons, limited in peak external signal energy. It is also desirable that the peak internal energy level of the transmitters be limited to intrinsically safe values, if possible, to reduce manufacturing complexity (hence cost) and to simplify the approval process. The restriction on peak signal energy means that link throughput will be maximised if modulation schemes producing low crest factor signals are used. Low crest factor signals have an average energy level which approaches the maximum possible for a given peak level, and thus maximise the bandwidth (and hence data rate) of the link for a given received SNR. This consideration, together with the desire for transmitter simplicity and power efficiency particularly for the mobile terminal 4, favours single carrier, constant amplitude modulation schemes such as m-PSK and m-FSK.

The carrier to noise power ratio at the receiver output for a given range and carrier frequency is proportional to the square of the magnetic moment of the transmitter. The peak energy stored in the transmit antenna magnetic field is limited, as mentioned above, for safety reasons. The achievable magnetic moment is, under these conditions, an increasing function of the effective antenna aperture (e.g. loop area). A portable miner terminal uplink is likely (at a given data rate) to be most severely limited in range (~50 m at 25 bps QPSK), due to physical limits on transmit antenna size.

For any peak-energy-limited link in a lossy medium, such as wet rock, there is an optimum carrier frequency which maximises the carrier to noise ratio at the receiver output. This frequency depends on the medium conductivity, the range, and the normalised effective noise level (as a function of frequency) at the receiver input. Assuming a typical case of a −6 dB decrease in magnetic field spectral noise density for each doubling of the frequency, the optimum frequency can be determined as:

$$\text{Optimum frequency} = k/(\sigma\mu r^2) \text{ Hz}$$

Where:
 k varies, depending on the direction of the receive loop relative to the transmit loop, from 2.55 when the loop axes are collinear to 4.75 when the loops axes are coplanar;
 $\sigma$ is the conductivity;
 $\mu$ is the permeability; and
 r is the range.

The magnetic moment of the transmit antenna, and noise levels at the receiver provide constraints on the possible range for a given data rate and modulation scheme.

For a medium of conductivity 0.05 $\Omega^{-1}\text{m}^{-1}$, corresponding to typical sedimentary rock, the optimum frequency for a 300 m surface-to-miner downlink is ~400–500 Hz, while that for a 50 m miner uplink (with very much smaller transmit magnetic moment) is ~10 kHz. In practice, the carrier frequencies are chosen to be at or near odd multiples of 25 Hz in order to provide maximum immunity to harmonics of 50 Hz power mains used in a number of countries, such as Australia. For countries using 60 Hz power mains, the carrier frequencies would be chosen near odd multiples of 30 Hz.

Using intrinsically safe transmit signal energy levels, the achievable range from the miner terminal is limited due to the rapidly degrading SNR at the receiver. To maximise the range, a low data rate is used. With regard to message traffic requirements, every reasonable effort is made to maximise the data rate and to minimise the non-productive link overhead. It was determined not to be practical to try to achieve a useable data rate over a direct link to the surface (~300 m), particularly in view of the higher typical background interference levels at a surface receiving site. Thus, the system advantageously includes an underground repeater 6 for the uplink. The data rate used between the mobile terminal 4 and the repeater 6 would be at least 1 bit per second and generally higher, with multiple mobile terminals communicating with a single repeater terminal.

If it is practical for the repeater 6 to use a large area transmit loop (e.g. around a pillar), it is possible to achieve an intrinsically safe link to the surface, with an acceptable data rate of more than 10 bits per second, using a carrier frequency of 400–500 Hz.

A practical implementation of the communications system therefore uses a multiple stage uplink via one or more repeaters 6, and transmits from the mobile terminal 4 at a carrier frequency of ~10 kHz and to the surface at 400–500 Hz from the repeaters 6. The downlink from the surface can, as mentioned previously, go directly to the mobile terminal or via a repeater. In the former case, a low carrier frequency is required, while in the latter case, the miner-to-repeater link could use a carrier frequency up to and beyond 10 kHz.

If link channel bandwidth is at a premium, which is more likely to be a problem at low carrier frequencies, simple QPSK (or QAM) modulation is preferred, but if there is bandwidth to spare, it may be traded for increased apparent effective baseband SNR and hence throughput. This is achieved by simply going to m-FSK modulation, but a more effective approach is to use FEC coding to provide a higher raw bit rate for any modulation scheme. If the channel bandwidth required exceeds ~25 Hz, a modified m-FSK modulation scheme can be used to operate in such an environment.

At any range (r) the optimum frequency decreases as $1/r^2$, as mentioned above, and the received signal amplitude varies as $1/(r^5)$ at this optimum frequency. This means that the range increase achievable by techniques such as m-FSK and FEC bandwidth expansion is relatively small. It also means, however, that the vast majority of miner-to-repeater links have a path loss which is substantially less than that at the range limit, particularly when the terminals 4 are in a position well within the limit. Links within the range limit are capable of a significantly higher throughput, so an architecture which supports adaptive variable rate links allows an overall message throughput which is about 5 to 25 times higher than for links at the limit.

The preferred system configuration is point to multi-point two-way with downlink broadcast capability and some level of message error control and delivery confirmation for each link direction. The message traffic is likely, under normal circumstances, to be predominantly downlink, and the uplink may limit system throughput or response time, particularly when global or group broadcast messages requiring delivery confirmation are being sent from the surface. Under these conditions, the uplink traffic will be dominated by delivery confirmation messages.

The uplink traffic will typically (in order of decreasing traffic volume) comprise: (a) link integrity check data; (b) downlink message receipt acknowledgment data; and (c) uplink message data. Accordingly, the system handles link integrity checking and message receipt acknowledgment as efficiently as practical, even to the extent of providing different protocols for the three classes of traffic.

In order to provide acceptably low latency when delivering or acknowledging receipt of short length high priority user messages, the link data block size is set to be relatively small compared to that used in typical communication applications. This means that minimising the average absolute link overhead, per user message data block delivered, will assist in maximising system message throughput. The main components of the overhead are typically:

(a) transmitter and receiver hardware settling guard time.
    (b) channel (media) access/grant information.
    (c) receiver demodulator synchronisation information.
    (d) data block boundary information.
    (e) addressing information.
    (f) message integrity check information.
    (g) message delivery verification information.
    (h) share of background link integrity monitoring information.

Minimising link overhead typically involves sharing overhead components among as many data blocks as is practical and reducing the amount of idle link time as much as possible, consistent with achieving acceptable latency targets. These constraints, together with a need for "ruggedness" in the presence of noise bursts, favour "synchronous" fixed block length protocols with adaptive traffic scheduling, as described below. Such protocols also simplify the implementation of "battery saving" operating modes.

A maximum range miner-to-repeater link ULA is likely to have significantly lower throughput than the repeater-to-surface link ULB. It may therefore be advantageous to have, within the service area of a repeater, many miner terminals active at the same time on different carrier frequencies. A difficulty with this approach is a potential dynamic range problem with the receiver in the repeater, caused by an excessively close miner terminal. There are, however, a number of ways around this problem. These include remote control of the transmit power level of the miner terminal and, more effectively, a miner terminal time slot scheduling scheme which groups miner terminals 4 into several different time slots based on their received power level at the repeater(s) 6.

If simultaneous transmissions from several miner terminals are allowed, the repeater-to-surface link becomes the bottleneck, so the repeater performs an uplink data concentration function. In particular, it passes link integrity and message delivery confirmation data from individual miner terminals to the surface in composite messages containing information from several terminals. This provides useful gains, because media access and error recovery overheads can then be shared, and there is no need to pass on non-productive poll responses.

As mentioned above, even with a thermal noise-limited link, FEC coding and detection increases the effective link SNR (and theoretical throughput) compared to the uncoded case. For noise that is burst-like or impulsive, the potential benefits are substantially greater, so FEC coding is incorporated into the system, particularly when it is intended to operate in an environment where impulsive interference (from electrical contactors, etc.) is present.

The efficiency of error detecting and error correcting codes drops off rapidly as the number of data bits "covered" by a particular check bit decreases, so the coding gains achievable with the relatively short data blocks of the system will fall short of those obtained in more typical communication systems. On the downlink, the problem may be reduced by applying coding over an error control block containing data packets with a variety of destinations, providing the latency target can be met, and the increased processing overhead at the miner terminal does not compromise battery life. This scheme is not applied on the miner terminal-to-repeater link, because the data is coming from different sources. Furthermore, coding gain is worst for the most common uplink traffic, link integrity data, since this consists of only a few bits per transmission.

Notwithstanding the lower coding gains achievable, it is still desirable to use FEC coding on the miner terminal uplink, particularly since burst or impulsive noise (for which the effective coding gain is higher) may be present. The limited channel bandwidth available may, however, require a tradeoff between the allocation of bandwidth to FEC redundancy as opposed to concurrent transmissions from multiple terminals. If, for example, a mean coding gain of 3 dB can be achieved with a rate 1/2 code, the uplink capacity of an individual terminal can be doubled, but the occupied bandwidth is quadrupled. The aggregate uplink capacity for a given available channel bandwidth is thus halved compared to the uncoded case. In this situation, coding may be favoured because if there is sufficient channel bandwidth it requires half the transmit energy per data bit and so increases battery endurance for the miner terminal 4. Information on code rates can be obtained from a text book such as "Digital Communications" by Bernard Sklar, published by Prentice-Hall.

If the aggregate channel bandwidth required to support the miner-to-repeater links of all miner terminals in an installation of the system exceeds the actual channel bandwidth available, a cellular channel reuse scheme is introduced. This is practical since the small useable range of the miner-to-repeater link means that many repeaters will be needed in a typical mine installation, and the rapid drop in field strength with range means that channels may be reused in relatively nearby cells. A cellular channel reuse scheme introduces significant link overheads associated with mobility management, so it is only considered if other measures do not provide sufficient aggregate traffic handling capacity for the system. In particular, variable rate signalling schemes (and even use of higher modulation order) are employed before applying channel reuse.

On the downlink, there is a choice as to the source(s) of the user message traffic and the various link overhead information elements intended for a particular miner terminal 4. The simplest approach is to pass all information directly from base station 8 to terminal 4, and none via the repeater 6, but this may not allow an acceptable aggregate downlink user message throughput. Ultimately, the simplest topology giving acceptable throughput, latency and reliability is chosen. This can be a hybrid, with system timing and user message traffic coming directly from the base station 8, while access control and link integrity verification traffic comes from the serving repeater(s) 6. The repeater-to-terminal links would, in this case, operate at non-optimal frequencies above those in demand for other purposes—that is, above 10 kHz. This is practical because the repeater transmit antenna aperture (and thus magnetic moment) would typically be many times larger than that of the miner terminal, so the additional path loss at somewhat higher frequencies could be tolerated.

Regardless of the link topologies chosen, the system architecture supports continuous or automatic fall-back redundancy at all levels above the individual miner terminal 4. Whether such capability is invoked/provisioned is then a choice for the installer of the system. In particular, it would be desirable if redundancy at the repeater level were provided by ensuring that any active area of the mine was served by more than one repeater. This would provide the greatest tolerance of mechanical damage, and would enable the use of lower cost repeaters with no internal redundancy.

The system also executes "graceful degradation" (such as reverting to lower link symbol rate) in the presence of excessive noise, and the miner terminals revert automatically to a "beacon" mode if individual link integrity is lost, as described below.

Since all repeaters share a relatively small available channel bandwidth (400–500 Hz carrier) for communication with the surface, this is likely to limit the ultimate up and downlink traffic capacities of the system, unless an additional (higher capacity) route exists. This route could be via a cable link between the base stations 8 and repeaters 6 which could also feed electrical power to them under normal working conditions. All repeaters would maintain radio link integrity monitoring with the surface at all times, and under emergency conditions, those repeaters isolated from the cable feed would operate on standby battery and use radio for communication with the surface. This reduces traffic capacity by an amount dependent on the number of isolated repeaters, but it would never be less than the entirely wireless system.

A simple two link system, as shown in FIG. 2, will typically require relatively small surface receiving antennas spaced at ~300 m intervals above the active areas of the mine. If this is impractical, the number of antennas may be reduced by employing the repeater-to-repeater links. These links are an additional drain on the channel bandwidth resources, but they can operate at the higher carrier frequencies (above 10 kHz) where there is more bandwidth available. Implementation of channel reuse on these links is also relatively simple and efficient, because they are static. The surface transmit antenna may be a single large loop, or 2–3 concentric loops.

Although verification of downlink message delivery and confidence in the two-way integrity of the communication channel between the surface and the miner terminal are very valuable, there are situations when continuous connectivity does not exist, and under these circumstances the system should still provide as much utility as possible. The miner terminal 4 can continue to receive downlink user messages, but at a reduced data rate and with no delivery guarantee, and entry of uplink messages is allowed, in readiness for automatic transmission to the surface as soon as the terminal can again communicate with a repeater. These capabilities support degraded repeater coverage under emergency conditions or in those areas of the mine where full coverage is not considered to be cost effective.

An underground communications system which incorporates the above features is described below.

Figure 5:
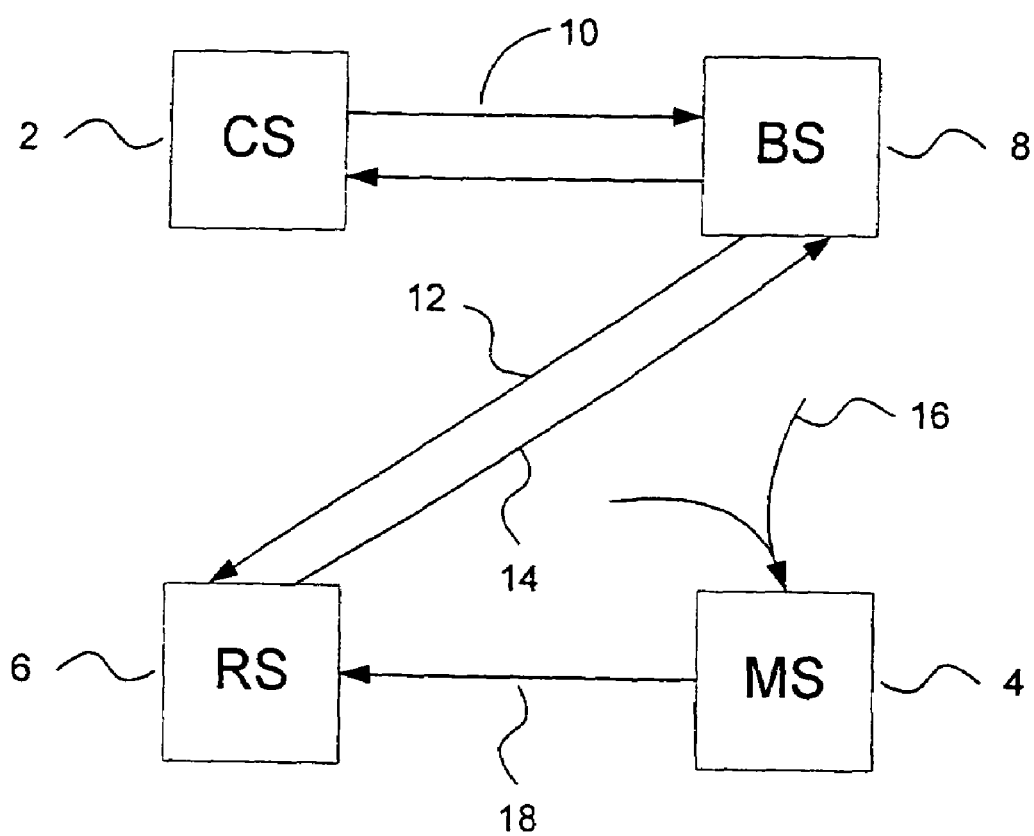
FIG. 5 is a block diagram of a fourth preferred embodiment of a communications system.

A system control entity broadcasts synchronous timing, timeslot allocation, and link frequency information etc from the CS 2 via the BSs 8 for the communications system, as shown in FIG. 5. This is disseminated to the repeater stations 6 and to the individual mobile stations 4. This information is varied as required in response to the changing propagation environment and traffic load presented to the various links.

The link 10 between the CS 2 and the BSs 8 may be a fixed electrical or optical link, or a wireless link, and can be omitted altogether when a CS 2 and BS 8 are combined. With regard to the message content passed on the other links 12 to 18, the uplink 14 from the RS 6 to the BS 8 passes repeater station link integrity/quality information, MS link integrity/quality information and MS uplink traffic, which may be regenerated and aggregated traffic. The downlink 12 from the BS 8 to the RS 6 passes system timing, access grant information relating to time and frequency, and other control data. A downlink 16 to the MS 4, which may contain elements originating either from BSs or RSs, can also be used to provide system timing and access grant information detailing again time and frequency and up and downlink information, together with broadcast messages, directed messages (ie messages addressed to specific terminals) and other control data for the mobile station 4. The uplink 18 from the mobile station 4 to the repeater station 6 passes data concerning: link integrity/quality information; broadcast message acknowledgement; direct downlink message acknowledgement; direct uplink messages; uplink channel access requests; and beacon information.

The ruggedness and throughput/latency performance of the system is typically limited by the MS to RS uplink 18. Generally, more than one RS receives an acceptable signal, having good SNR, from a particular MS and passes traffic from that station to the BS(s), together with estimates of the received signal strength and SNR. The control station 2 combines these redundant uplink streams to give a logical uplink of enhanced ruggedness and reliability, which is not dependant on the availability of any individual RS or BS. It also uses the link integrity/quality information from the MS, together with the signal strength and SNR forwarded from the various RS(s), to determine the actions necessary to optimise communication with individual MS(s) and the aggregate throughput of the system. This is achieved by varying the downlink and uplink data rate for individual MS(s) and/or handing the MS over to another operating frequency and/or adjusting the timeslot allocation/duration, as described below. If the RS to BS uplinks are limiting the throughput of the system, dynamic, traffic based optimisation can be performed on these links as well. A RS provides concentration/editing of the traffic from individual MS(s), under the control of the CS. Under these circumstances, the CS commands an individual RS to suppress traffic from all but an individual dynamically determined subset of the MS, chosen to ensure that no more redundant links are provided than are necessary to give adequate redundancy for each MS. Furthermore, only changes in MS link integrity are signalled in order to minimise overhead traffic. The architecture provides: link integrity monitoring; broadcast message delivery with confirmation; directed message delivery in both directions with confirmation; and localisation of the MS(s).

Figure 6:
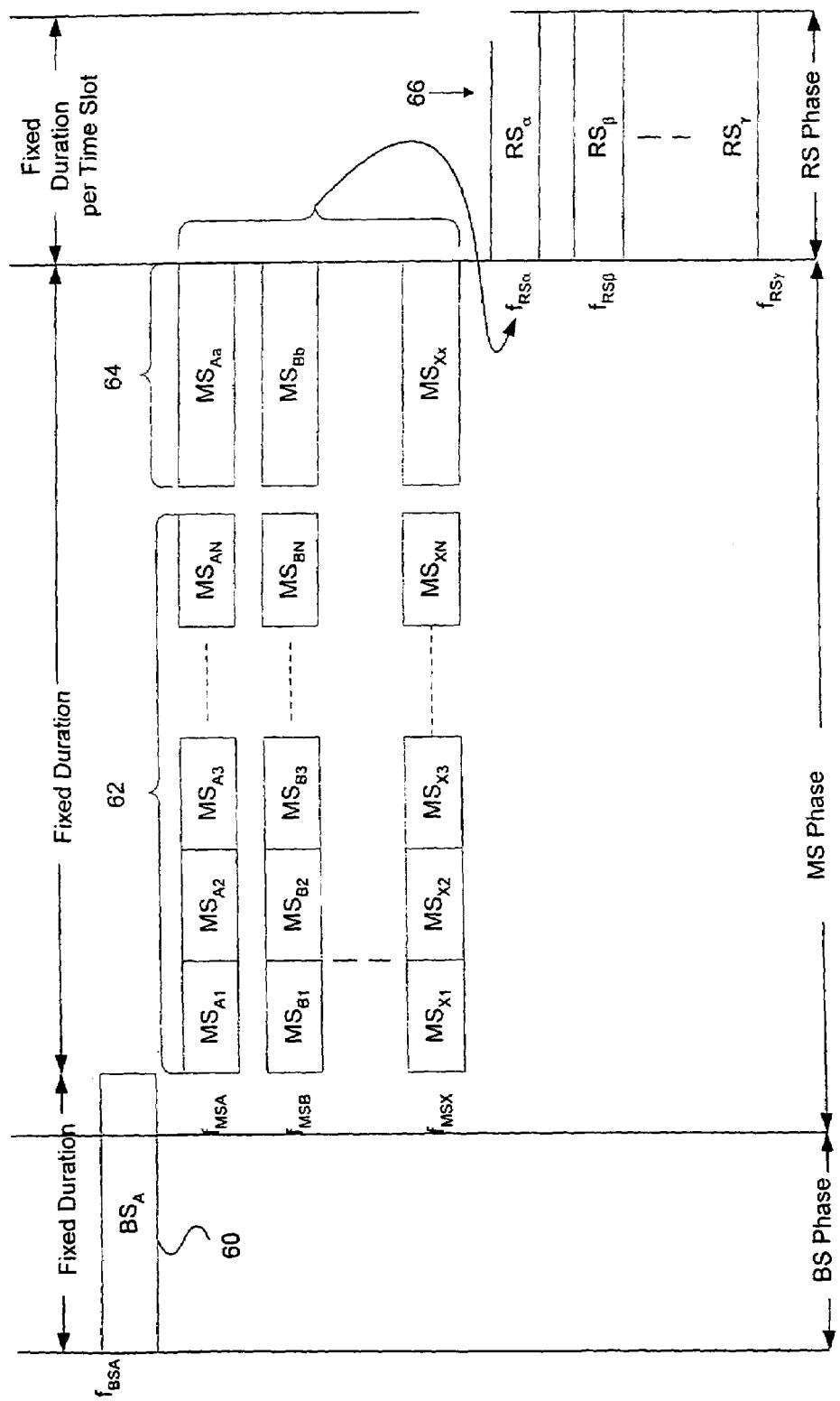
FIG. 6 is a block diagram showing the time relationship for types of communications frames transmitted between stations of the communications system during a communications cycle.
Figure 7:
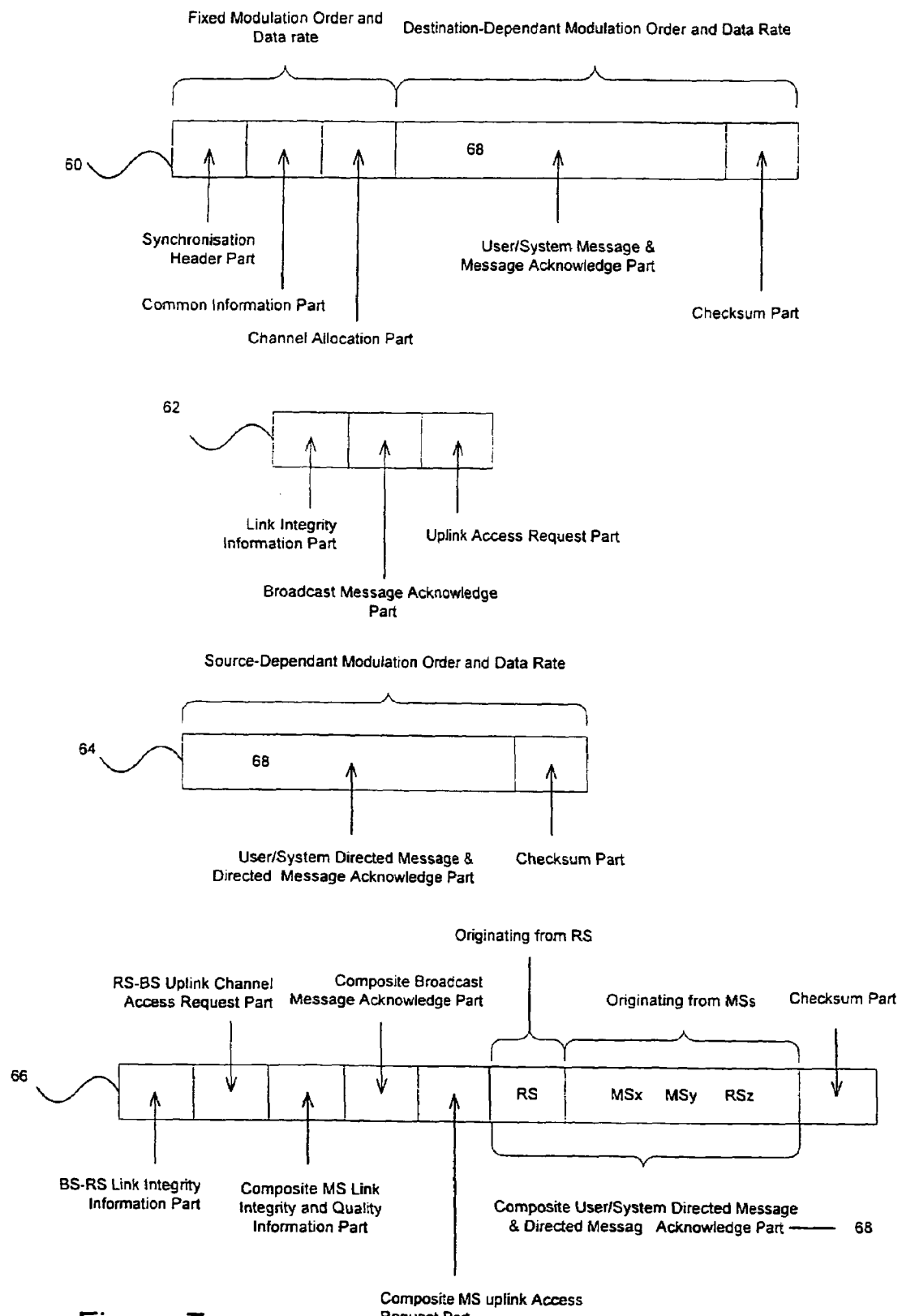
FIG. 7 is a block diagram of the data frames used by the stations of the communications system.
Figure 8:
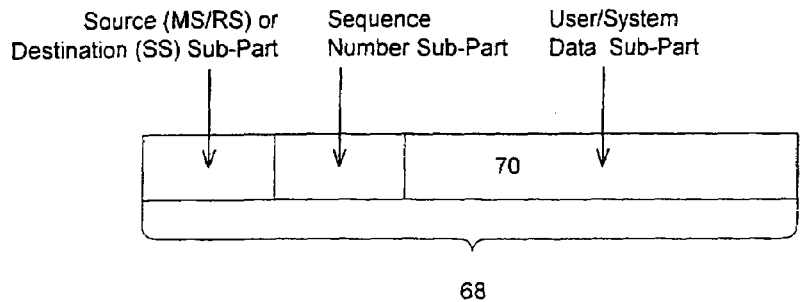
FIG. 8 is a block diagram of a message part of the frames of the stations.

A typical system traffic cycle is shown in FIG. 6. The MS may provide a multiple of concurrent MS to RS frequency channels, and similarly the RS may provide a multiple of concurrent RS to BS frequency channels, as shown in FIG. 6. The component fields of the BS frames 60, the MS status frames 62, the MS message frames 64 and the RS frames 66 are shown in FIG. 7. The user/system message part 68 of the BS and RS frames and the MS message frame is shown in detail in FIG. 8. The user/system data subpart 70 of the user/system message part 68 of FIG. 8 may be generated from an original user message 72 by compressing the original message 72, and then segmenting it into segments 74 that are FEC encoded to produce the subparts 70.

Multiple access on the uplink is by time and/or frequency division multiplexing, combined with access scheduling. Multiple access on the downlink is by explicit station addressing and/or by time division. There may be transmissions from one or more mobile stations in time sequence, or concurrently (on separate frequencies) and the transmissions from various types of entity may, in some embodiments, take place simultaneously or alternatively in a partially or totally non-time overlapping manner. The BS, MS and RS phases may (dependant on the channel frequencies used and equipment performance considerations) be distinct, as shown in FIG. 6, or time overlapped. If overlapped, the overlap may be partial, so that an individual entity (MS, etc.) is not required to transmit and receive at the same time. Although the various phases are shown as being of fixed duration, it is apparent that the durations could be modified as a result of adaptation mechanisms.

An RS can be configured to handle a multiple of receiver channels, at different carrier frequencies, received on respective antennas of the RS.

The base, mobile and repeater stations all execute the same basic transmitting and receiving operations, and the basic receiver and transmitter components are the same, as described below, with configuration differences between the stations.

Figure 10:
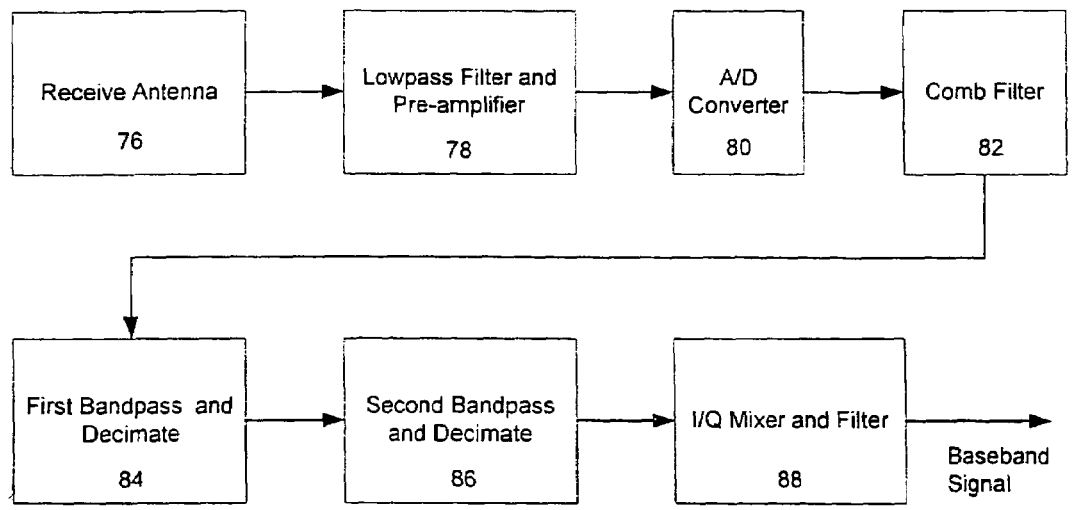
FIG. 10 is a block diagram of a first part of a receiver of the stations.
Figure 12:
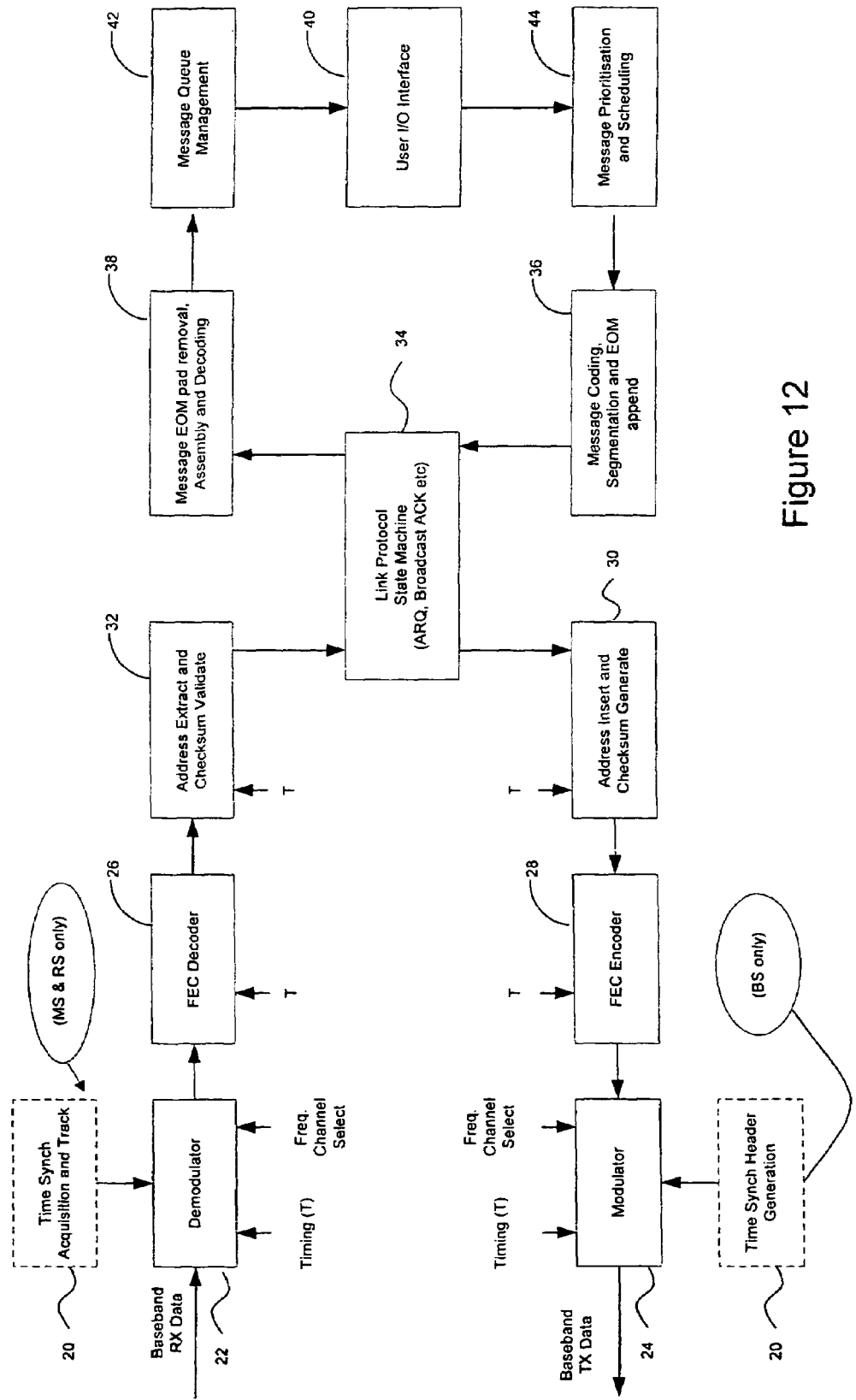
FIG. 12 is a block and flow diagram of modules of the receiver and transmitter.

The receiver front-end of each station, as shown in FIG. 10, uses a loop antenna 76 to detect the signal. This loop can be air-cored, or be wound on a ferrite or other magnetically permeable core. In addition, it may be tuned or untuned. The mobile station 4 uses a tuned ferrite-cored loop to maximise the received signal in a small volume. At the repeater station a single untuned air-cored loop is used with an effective area of 50 $m^2$ turns. Being untuned, it is able to detect the 575 Hz surface-to-repeater transmission as well as the 10,575 Hz mobile station to repeater transmission. If tuned loops are used, then two separate antennas may be needed, but the system can be made smaller, and more robust. The output of the loop is low-pass filtered and amplified by an amplifier 78 to a level suitable for an A/D converter 80. The subsequent operations are executed in software, as described in detail below, but can be performed in many different ways, and it is possible to do these operations with analog circuits. For example, the receiver may be implemented with an analog frequency down-converter preceding the A/D converter 80 to reduce system clock rate. In the receivers of the system, the operations executed by respective software code components are comb filter 82, first bandpass filter 84, decimation by 16, second bandpass filter 86, decimation by 5, and then I,Q quadrature mixing 88 to produce a baseband signal. Following this is a signal detection and timing extraction process. When the signal timing has been determined, the timing operation is used to control a demodulator (in the present case either BPSK or QPSK). Data is then sent to a detector for decoding. This then goes to a link protocol state machine, which also generates output data and control for the transmitter modulator, as described below with reference to FIG. 12.

Figure 11:
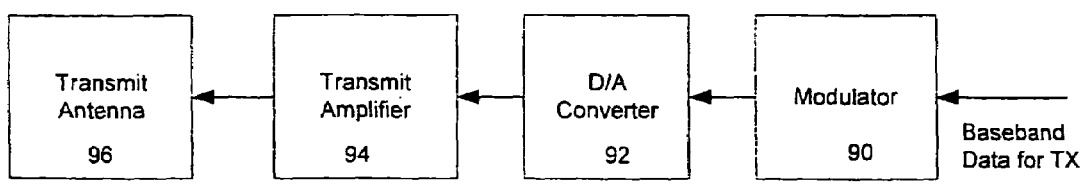
FIG. 11 is a block diagram of an output stage of a transmitter of the stations.

The transmitter for the stations 4, 6 and 8, as shown in FIG. 11, passes the baseband data for transmission to a digital modulator 90. The modulator output is connected to a D/A converter 92 which drives a TX amplifier 94 (various types, such as class A, AB and C amplifiers can be used). In the surface and repeater stations the transmit antenna 96 usually consists of a single turn of wire with about a 50 m diameter. Large diameter antennas can provide better coverage and range. For the mobile station the transmitter antenna may be a coil wound on a ferrite rod (usually tuned to minimise battery drain) or included in a wearable device, for instance in a vest or belt.

For each of the three stations 4, 6 and 8 the transmitter and receiver antenna may be the same physical structure, together with a switch device to switch the use of the antenna between the transmitter amplifier and the receiver.

In the transmitter, all operations executed before the D/A converter 92, are executed by software, and, as mentioned above, all operations after the A/D converter 80 of the receiver are executed by software. These basic operations are the same for each of the three stations 4, 6 and 8, and are described below with reference to FIG. 12. The operations can also be executed, as will be understood by those skilled in the art, wholly or partly by specific hardware circuits, such as application specific integrated circuits (ASICs) using either digital and/or analog processing techniques.

Time synch and acquisition modules 20 handle system-wide time synchronisation and coordination of transmit/receive activity on the various wireless links. Time synchronisation is established and maintained with reference to a synchronous global timing cycle, followed by all stations of the communications system. This cycle provides a time reference for the start and end of all transmission frames as well as the components of these flames and the individual link data symbols. Synchronisation of this global cycle is achieved by the periodic transmission of synchronisation headers from the CS/BS subsystem to all other elements. These headers are uniquely distinguishable (by carrier frequency, modulation, coding, etc.) from all other information transmitted within the system, so as to facilitate recognition and tracking by the RS and MS stations. The synchronisation information is extracted by each of the slave stations with the aid of digital delay tracking loops. This provides substantially increased resistance to corruption of system timing due to impulsive noise and other interference.

The modulator 22 and demodulator 24 use BPSK/QPSK modulation and a variant of differentially coherent detection. The common control and broadcast information is transmitted at a fixed data rate while individual directed user and system messages are transmitted at a data rate determined by a link management entity, described below. The timing of all the transmission/reception relative to the system cycle is also determined by the link management entity.

The BS transmissions do not, typically, have the same power restrictions as MS and RS transmissions, so higher aggregate data rates, for a given received SNR, can be achieved. The required data rate (per BS) to achieve adequate downlink traffic capacity may result in an RF bandwidth requirement exceeding the frequency spacing of harmonics of the local AC power frequency which form the dominant source of interference at these frequencies (below ~2 KHz). In this case, a variant of m-FSK or multi-carrier modulation which makes use of the RF bandwidth between several successive interfering harmonics, is used.

An FEC decoder 26 and encoder 28 use a forward error correction (FEC) block code, such as the Hamming code, together with data interleaving to improve the error rate performance in the presence of impulsive noise and other interference. Where possible, the block size for FEC is maximised by aggregating related traffic. A cyclic redundancy checksum (CRC) for use in automatic retransmission request (ARQ) error control and message confirmation schemes is applied by the checksum generator 30 to the relevant portions of the various message frames, and extracted by the checksum validator 32. As with FEC, the block size is maximised where possible for increased coding and detection efficiency. Where possible, individual traffic components are aggregated to give a larger block size for FEC/CRC processing. In particular, BS frames can contain user/system parts directed to different RS/MS elements, and RS flames contain traffic aggregated from several MS.

A Link Protocol State Machine 34 handles link access control, ARQ processing and delivery confirmation. There are multiple link protocols providing overall system synchronisation/control, MS uplink access management, directed message ARQ/delivery confirmation and broadcast message ARQ/delivery confirmation. Broadcast message delivery confirmation information is contained within MS status flames while delivery confirmation of directed message frames is contained within reverse-path (MS, RS or BS) message frames. This arrangement leads to optimum message throughput and minimum delivery confirmation latency. Both message types rely on a "windowed" ARQ scheme, based on flame sequence numbering, which maximises throughput on the links, and the broadcast message protocol is arranged to deliver messages as rapidly as possible to the majority of MS elements.

Figure 9:
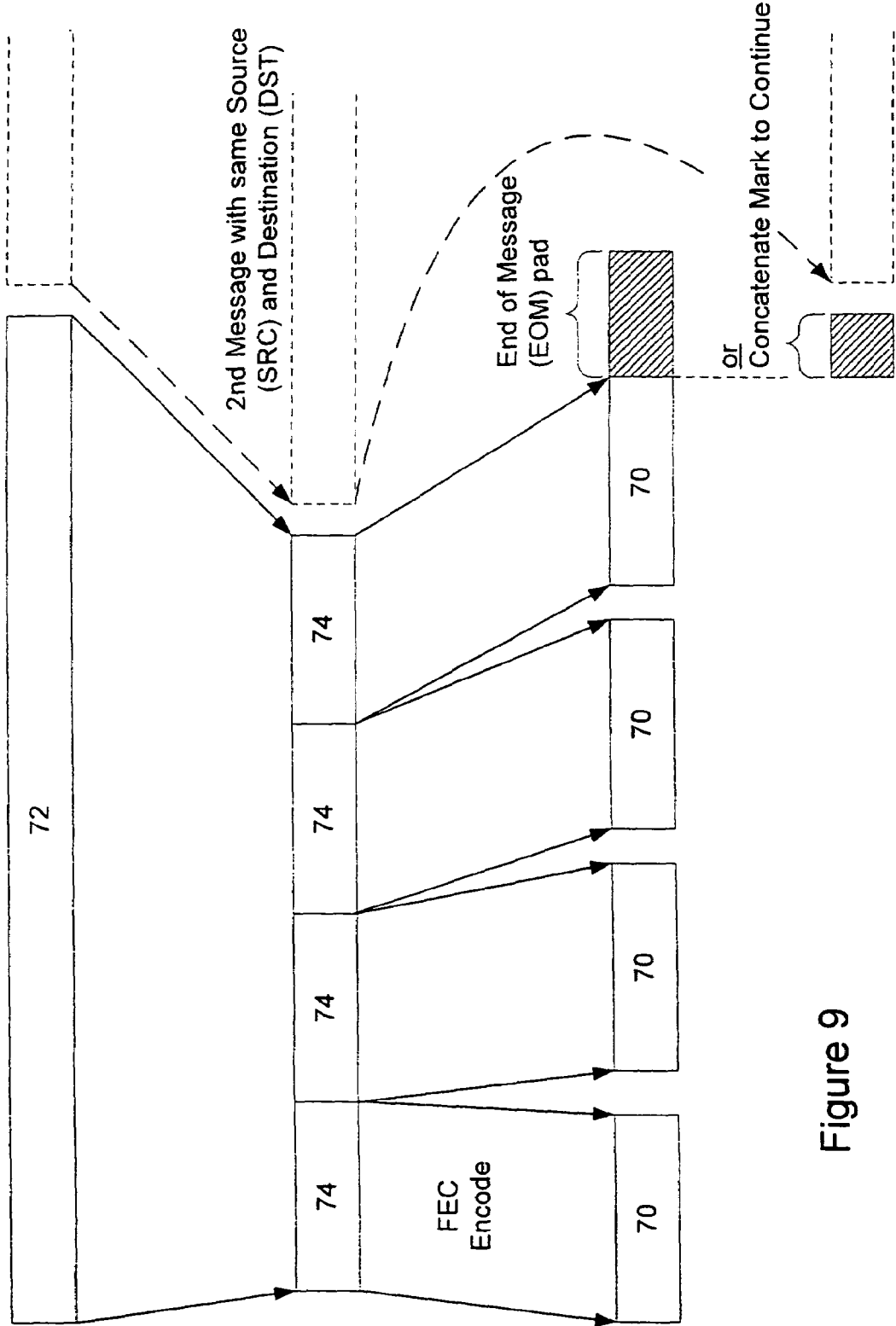
FIG. 9 is a schematic diagram of generation of the message part of FIG. 8.

A message segmentation module 36 and a message assembly module 38 handle, respectively, message disassembly and reassembly. Fixed-length system/user data subparts are used in frames sent over the various links, so variable length user messages are split into sections which form the subparts, as shown in FIG. 9. If there is only one message currently queued for a particular route, the last subpart is terminated with a unique end of message (EOM)/PAD sequence. If another message is already queued, a subpart may contain both the end of the first message and the start of the second message, with a unique (short) EOM/SOM (start of message) sequence separating them. Source coding is used with user messages to provide data compression and so increase the user message throughput of the system. This consists of a variant of Huffman coding which encodes, to form variable length symbols, commonly used words and phrases in addition to text characters. Such a coding scheme allows efficient representation of EOM and SOM sequences. For example, a terminating "?" or "!" in the message text may be encoded as part of a specialised (and short) EOM symbol. In general, a different encoding dictionary is used for downlink and uplink, because user message traffic is likely to have substantially different content/statistics in the two directions.

A user interface 40 provides significantly different functionality and presentation services for the various stations CS, BS, RS and MS. The MS uses a robust single- or multi-line LCD display and short-form keypad. The CS uses a multi-window, multithreaded graphical user interface with full keyboard, but with the ability to generate common messages and commands via a "point and click" GUI. It also incorporates message time stamping and logging facilities together with an "undelivered message" reminder and network integrity display. The BS and RS user interfaces are mainly used for setup and maintenance purposes, but also incorporate the normal user message functions to assist installation. They are preferably implemented using a removable keyboard/display unit.

In general the various user interfaces include the following functions:

(i) Message entry/editing.
(ii) Message prioritisation.
(iii) Message transmission progress display.
(iv) Received message display (with progressive update).
(v) Message history (and logging for CS).
(vi) Link (MS, RS, BS) or network (CS) status display.

(vii) System control (CS).

(viii) Diagnostic/maintenance interface.

Figure 13:
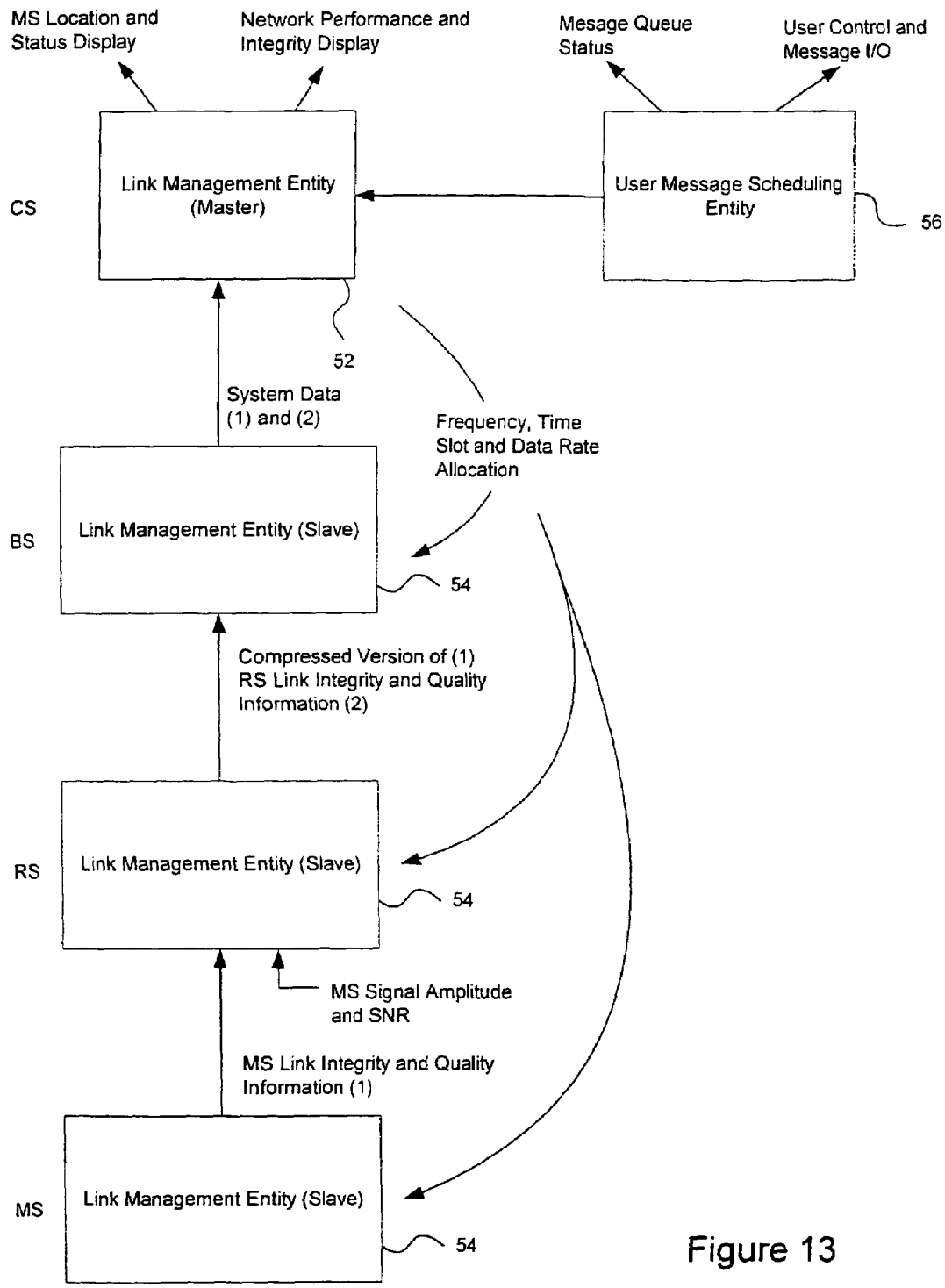
FIG. 13 is a block diagram of link and message management modules of the stations.

The system executes traffic scheduling to assist in maximising the user message throughput and minimising the transport latency. In the MS and RS this is achieved by user message prioritisation, queuing and uplink access request initiation 44. In the CS, message prioritisation and queuing is also performed, but, in addition as shown in FIG. 13, a message scheduling entity 56, working with a master link management entity 52, provides adaptive system optimisation by adjusting frequency, timeslot, modulation type and data rate allocation on the various data links. Individual transmit entities (described as a particular source, and a particular traffic type) are delineated by timeslot and/or carrier frequency. A slave link management entity 54 in each communication element (MS, RS, BS) is responsible for local control of the timeslots, carrier frequencies, modulation types, and modulation rate, in response to information signalled to it from the master link management entity 52 in the CS. The slave entities also generate/interpret link integrity/quality data for the master entity. The entities 52 and 54 are executed by the link protocol state machine 34.

The functionality of the entities 52, 54, 56 varies from minimal (in the case of the MS) to relatively complex (in the case of CS). The message scheduling entity 56 is responsible for message transmission prioritisation and scheduling as well as network traffic bandwidth management while the link management entity 52, 54 is responsible for the support of adaptive frequency, timeslot and data rate allocation on the various data links. The two entities 52 and 56 work together in the CS to adapt the system configuration in such a way as to maximise system user message throughput and to minimise transport latency when throughput is not the limiting factor.

The master message scheduling entity 56:

(i) determines the relative proportions of traffic bandwidth to be allocated to broadcast messages, directed messages, network status monitoring and network configuration control.

(ii) controls retransmission (ARQ) scheduling on the downlink and the uplink.

(iii) provides traffic bandwidth allocation commands to the link management entity 52.

(iv) implements various system operating modes, such as normal communication, emergency (manually directed) communication and beacon search.

(v) provides message queue status (transmit progress monitoring) display information to the CS user interface.

(vi) provides "undelivered message" display information to the CS user interface.

(vii) provides user message I/O in conjunction with the user interface.

The link management entity 52, 54:

(i) configures the RS repeater 6 behaviour so as to maximise aggregate message throughput while providing adequate MS to RS link redundancy.

(ii) issues frequency, timeslot and data rate allocation commands to MS, RS and BS elements.

(iii) facilitates communication with a rapidly moving remote MS (for example a vehicle or cage borne MS) by ensuring it has potential access to all RS repeaters.

(iv) provides MS location and status display information to the CS user interface.

(v) provides network performance/integrity display data to the CS user interface.

The stations 2, 4, 6 and 8 of the system are also configured to execute the following functions:

(a) Downlink-only mode. This is a mode of operation (protocol) which provides one-way downlink communication from CS/BS to MS, without the need for RS uplink repeater stations. This mode, which can coexist with the normal bidirectional communication mode, would be of value after an event which has destroyed the RS repeater infrastructure in a region of a mine or in those cases where it is decided that it is not cost effective to provide full RS coverage of all regions of the underground mine.

(b) MS beacon mode. This is a free running mode of the MS which does not require external synchronisation (from CS/BS or RS), but which provides an interference resistant one-way beacon signal which maximises range for a given peak transmit field stored (inductive) energy. The signal is designed to facilitate (by use of a unique pseudo-random transmit time and/or modulation pattern) unique identification of a particular MS in the presence of other MS beacon signals, while minimising power consumption for a given mean time to uniquely identify each miner terminal. The mode is potentially useful in emergency situations for locating trapped individuals when, for some reason, the full system, particularly the CS/BS, is not functional.

(c) MS and RS transmit control. The ability to remotely suspend and restore (by command from the CS) transmissions from selected MS and/or RS elements is useful in situations where power consumption must be minimised (e.g. to extend battery endurance) or background co-channel and adjacent-channel interference must be controlled. These situations may occur during search and rescue operations for trapped individuals.

(d) Frequency/phase locked transmission. An extension of the synchronous system timing regime is the frequency/phase locking of MS and/or RS transmissions, via the BS frame transmissions, to a precision reference in the CS/BS subsystem. This is particularly useful in the case of the MS, because it allows synchronous detection and long term averaging of MS transmissions when searching for or communicating with an MS at ranges exceeding the normal maximum range of the MS-to-RS link. It avoids the need for a high accuracy (less than 1 part-per-million drift) frequency reference in each MS and RS.

A limitation of the communications system described above is the limited magnetic moment that can be generated by a compact portable transmitter of the mobile station. The magnetic moment is limited to about 1 $Am^2$ if intrinsic safety is to be maintained. In underground mines this may limit operating the distance between the receiver and transmitter to less than about 70 m. Most mines cover a number of square kilometres underground and thus the coverage of each receiver to mobile transmitters in the mine may only be a fraction of 1% of the total mine.

To increase the operating range one approach is to introduce a number of spatially separated receivers all connected to the one repeater station. This will increase the total area covered by each repeater station. For example, nine receivers with just overlapping coverage increase the effective range by a factor of 3. Say from 70 m radius to a 210 m radius.

Each remote unit can be very simple. At the minimum it simply consists of a passive receive loop connected back to the repeater station. Such an arrangement is inherently intrinsically safe. For higher sensitivity the remote unit would incorporate a preamplifier/buffer. In this case, intrinsic safety requirements are still easily met.

Figure 14:
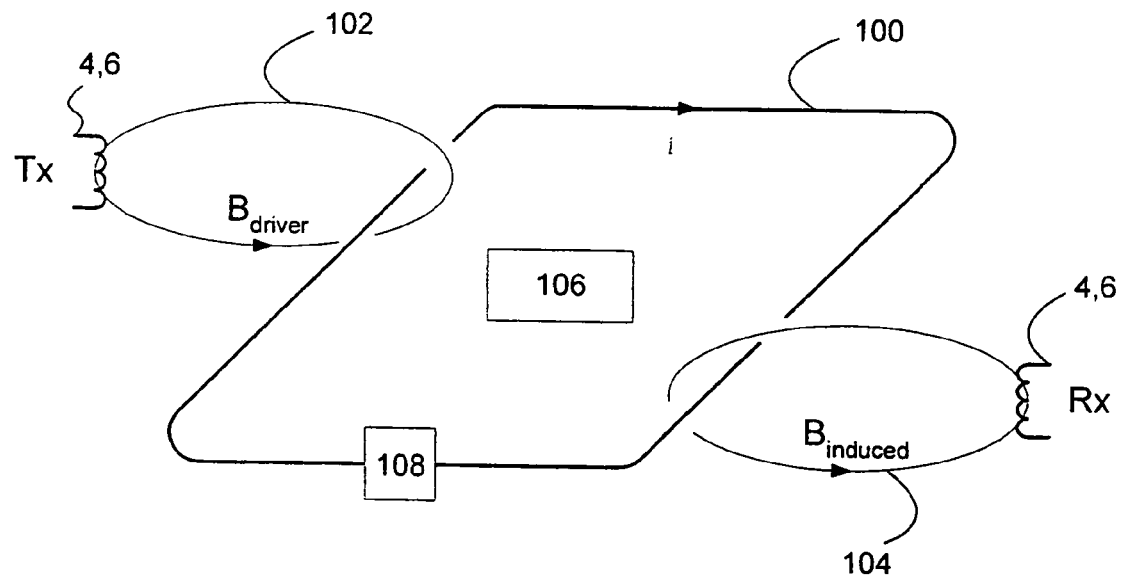
FIG. 14 is a diagram of a magnetically coupled conductive loop used to extend the range of a mobile station of the system.

Another approach is to use magnetically coupled but electrically isolated loops 100 of electrical conductor, within magnetic coupling range of the mobile station 4 and repeater station 6, as shown in FIG. 14. Any conductor that forms a closed loop 100 will act to make the total change in magnetic flux passing through the loop zero. It does this by way of an electric current that is induced in the loop by the magnetic field 102 of the transmitter. This current produces a magnetic field 104 that opposes the field generated by the transmitter within the loop (Lenz's Law). Outside the loop the two fields add. Thus, in the region outside the loop, the magnetic field produced by the current in the loop augments the magnetic field generated by the transmitter. The basic principle being used is that a time varying magnetic field induces an emf and hence causes a current in a closed loop of conductor. These currents produce their own magnetic field and it is this extra magnetic field which will be used to improve the range of the system.

Within a mine it is usual to leave pillars which support the roof. The nature of the magnetic field within the pillar 106 is of no importance because it is inaccessible. Thus placing a conducting loop around a pillar will increase the magnetic field in the area outside the pillar. Because the current range of the system is comparable with the size of pillars in a mine it is expected that the performance improvement will only occur when the portable transmitter is in the same gallery or cut-through as the conducting loop. In this configuration it is expected that the magnetic field at the far side of the pillar is largely due to the current in the conducting loop. In effect the loop is acting as a "magnetic relay" in the magnetic link between the transmitter and the receiver transferring the magnetic field that would have been generated within the pillar to a region uniformly distributed around the pillar. Wrapping the next pillar along with a conducting loop can extend this concept. The edges of the two loops would share the same mine gallery and we have a situation where the conductors in the two loops run parallel for some distance. This would provide coupling from one loop to the next and so further extend the range. The loop can be made from steel hawser and hence be made very robust.

The condition for the total change of magnetic field within the loop being zero occurs when the impedance around the loop is dominated by its inductance. According to the Faraday induction law the magnitude of the voltage (V) induced around the loop is equal the rate of change in flux through the loop. This voltage then induces a current (I) in the closed loop where. I=V/Z where Z=R+jωL with R is the resistance, L the inductance of the loop. With R small the inductance dominates Z and the total change of flux through the closed loop is forced to zero due to the field generated by I.

If instead of shorting the loop a capacitor C 108 is included with impedance equal in magnitude to that due to the inductance of the loop (that is 1/jωC=jωL) to join the ends of the loop, the total impedance around to loop is now just R. The current and hence augmenting magnetic field is now increased by the Q of what is now a resonant circuit.

$$Q=\omega L/R$$

Thus tuning the loop with a capacitor 108 can increase the augmentation and further increase the range.

The conducting loop may partly or completely use existing infrastructure. In a mine there are usually many long conductors, such as water pipes and power cables. A magnetic transmitter situated next to such a conductor will induce an emf distribution along it. Depending on the earthing of the conductor, this emf distribution can cause currents which travel for a considerable distance along the conductor. Thus it will be advantageous to use receivers and or transmitters that are closely coupled to such a conductor.

Figure 15:
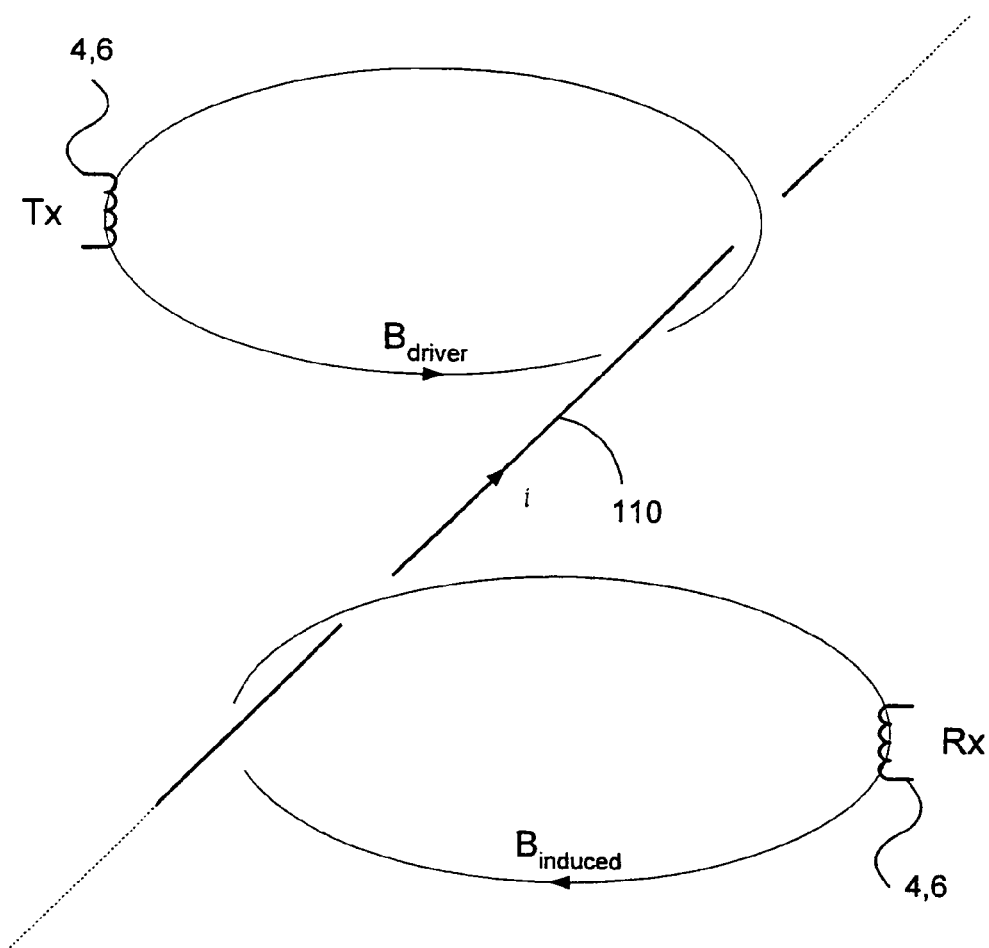
FIG. 15 is a diagram of a long conductor used to provide a magnetically coupled loop.

The most advantageous situation is a long conductor 110, as shown in FIG. 15, grounded at both ends. This in effect forms a loop with the return path through the ground. In this case, the induced current is uniform along the length of the conductor and communications can be established with any mobile station in or near the tunnel in which the conductor is located. It will also be advantageous to install extra conductors to take advantage of this effect. Also instead of loops, long conductors can be used to achieve the same magnetic coupling, induce a current in the conductor and generate a field which increases the range of the mobile station.

Many modifications will be apparent to those skilled in the art without departing from the scope of the present invention as herein described with reference to the accompanying drawings. For example, the system may provide for the exchange of user messages between mobile stations. Also at least one mobile station may be used for the control and monitoring of infrastructure rather than communications to a miner.

What is claimed is:

1. A communications system, including:
    at least one base station above a planetary surface;
    at least one repeater station below the planetary surface; and
    at least one mobile station below the planetary surface;
    said base, repeater and mobile stations establishing a bidirectional wireless communications path through said planetary surface between the mobile station and the base station; and
    said communications path from the mobile station to the repeater station being a magnetically coupled wireless communications path, and having first carrier frequencies between the mobile station and the repeater station and second carrier frequencies between the repeater station and the base station that are less than 30 kHz.

2. The communications system as claimed in claim 1, wherein said at least one base station is at the surface.

3. The communications system as claimed in claim 1, wherein the bidirectional communications path includes a first uplink from the mobile station to the repeater station and a second uplink from the repeater station to the base station.

4. The communications system as claimed in claim 3, wherein the communications path includes a downlink from the base station to the mobile station.

5. The communications system as claimed in claim 3, wherein the communications path includes downlinks from the base station to the repeater station and from the repeater station to the mobile station, respectively.

6. The communications system as claimed in claim 1, wherein said communications path between said base station and said mobile station is a magnetically coupled path, having a carrier frequency less than 30 kHz.

7. The communications system as claimed in claim 1, wherein the first carrier frequencies are substantially higher than the second carrier frequencies.

8. The communications system as claimed in claim 1, wherein the antennas of the stations include conductive loops, and the antennas of the base station and the repeater station have substantially collinear axes, and the antennas of the repeater station and the mobile station are substantially coplanar.

9. The communications system as claimed in claim 8, wherein a carrier frequency between stations is determined by $k/(\sigma\mu r^2)$ Hz, where:
k varies, depending on the direction of a receive loop relative to a transmit loop of said antennas, from about 2.55 when loop axes are collinear to about 4.75 when loop axes are coplanar;
$\sigma$ is the conductivity of the transmission medium;
$\mu$ is the permeability of the transmission medium; and
r is the range of the communications path.

10. The communications system as claimed in claim 1 or 9, wherein for communications through earth, a carrier frequency between the mobile station and the repeater station is approximately 10 kHz and a carrier frequency between the repeater station and the base station is approximately 500 Hz.

11. The communications system as claimed in claim 8, wherein the mobile station includes an antenna with a relatively reduced aperture compared to the apertures of the repeater station and the base station antennas.

12. The communications system as claimed in claim 1 including a plurality of the repeater station arranged in a cellular structure to cover respective communication cells.

13. The communications system as claimed in claim 1, wherein said stations include link management means for monitoring characteristics of links between the stations, respectively, and for adapting communication parameters of links between the stations on the basis of said characteristics.

14. The communications system as claimed in claim 13, wherein said characteristics include link integrity and quality based on signal strength and signal-to-noise ratio (SNR) data.

15. The communications system as claimed in claim 14, wherein said parameters include frequency, timeslot, modulation type and/or data rate allocation.

16. The communications system as claimed in claim 15, wherein said modulation type includes one of QPSK, QAM and m-FSK.

17. The communications system as claimed in claim 16, wherein said modulation type allows feedback error recovery by including FEC encoding.

18. The communications system as claimed in claim 15, wherein the data rate between said mobile stations and said repeater station is at least one bit/s and the data rate between said repeater station and said base station is greater than 10 bit/s.

19. The communications system as claimed in claim 13, wherein said at least one base station includes a control station for said stations.

20. The communications system as claimed in claim 19, wherein the control station includes a master of said link management means for controlling said adapting of said communication parameters.

21. The communications system as claimed in claim 20, wherein said control station includes message scheduling means for determining traffic bandwidth allocation and generating traffic bandwidth allocation commands for said master link management means.

22. The communications system as claimed in claim 19, wherein said repeater station concentrates and edits traffic on said communications path, under the control of said control station.

23. The communications system as claimed in claim 13, wherein messages for a user of said mobile station are segmented and encoded to provide feedback error recovery.

24. The communications system as claimed in claim 13, wherein said link management means and said communications path are adapted to execute link integrity monitoring.

25. The communications system as claimed in claim 1, wherein said link management means and said communications path are adapted to execute broadcast message delivery with confirmation.

26. The communications system as claimed in claim 13, wherein said link management means and said communications path are adapted to execute directed message delivery in both directions of said path with confirmation.

27. The communications system as claimed in claim 13, wherein said link management means and said communications path are adapted to enable determination of the location of said mobile station.

28. The communications system as claimed in claim 1, wherein said at least one mobile station has a beacon mode during which said mobile station generates a unique beacon signal detectable in the absence of said communications path.

29. The communications system as claimed in claim 1, having a downlink mode establishing a unidirectional link from said base station to said mobile station without reliance on said repeater station.

30. The communications system as claimed in claim 1, wherein at least part of said communications path is through a partially conductive medium.

31. The communications system as claimed in claim 30, wherein said partially conductive medium comprises rock.

32. The communications system as claimed in claim 30, wherein said partially conductive medium comprises water.

33. The communications system as claimed in claim 12, wherein said plurality of repeater station execute a frequency re-use scheme for carrier frequencies of different and concurrent communications traffic of said communications path.

34. A communications system, including:
at least one base station_above a planetary surface;
at least one repeater station below the planetary surface; and
at least one mobile station below the planetary surface;
said base, repeater and mobile stations being adapted to establish a bidirectional communications path through said planetary surface between the mobile station and the base station, and the communications path from the mobile station to the repeater station being a magnetically coupled wireless communications path;
wherein at least part of said bidirectional communications path is through a partially conductive medium, and carrier frequencies of said bidirectional communications path being less than 30 kHz.

35. The communications system as claimed in claim 34, wherein said partially conductive medium comprises rock.

36. The communications system as claimed in claim 34, wherein said partially conductive medium comprises water.

37. A communications system, including:
at least one base station_above a planetary surface;
at least one repeater station below the planetary surface; and
at least one mobile station below the planetary surface;
said base, repeater and mobile stations being adapted to establish, without reliance on any connective infrastructure, a bidirectional communications path through said planetary surface between the mobile station and the base station, and the communications path from the mobile station to the repeater station being a magnetically coupled wireless communications path, and carrier frequencies of said bidirectional communications path being less than 30 kHz.

38. The communications system as claimed in claim 37, wherein at least part of said communications path is through a partially conductive medium.

39. The communications system as claimed in claim 38, wherein said partially conductive medium comprises rock.

40. The communications system as claimed in claim 38, wherein said partially conductive medium comprises water.

* * * * *